United States Patent
Toyoshima et al.

(10) Patent No.: US 12,005,815 B2
(45) Date of Patent: Jun. 11, 2024

(54) VEHICLE SEAT

(71) Applicant: TOYOTA BOSHOKU KABUSHIKI KAISHA, Aichi (JP)

(72) Inventors: Hiroki Toyoshima, Aichi (JP); Junpei Sato, Aichi (JP); Akiko Hirose, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/947,568

(22) Filed: Sep. 19, 2022

(65) Prior Publication Data
US 2023/0086757 A1 Mar. 23, 2023

(30) Foreign Application Priority Data
Sep. 21, 2021 (JP) .................... 2021-153483

(51) Int. Cl.
*B60N 2/16* (2006.01)
*B60N 2/02* (2006.01)
*B60N 2/18* (2006.01)

(52) U.S. Cl.
CPC .......... *B60N 2/0224* (2013.01); *B60N 2/1615* (2013.01); *B60N 2/165* (2013.01); *B60N 2/1864* (2013.01)

(58) Field of Classification Search
CPC .... B60N 2/165; B60N 2/0224; B60N 2/1615; B60N 2/1864
See application file for complete search history.

(56) References Cited

U.S. PATENT DOCUMENTS

| 4,264,050 A * | 4/1981 | Wahls .................... B60N 2/507 248/585 |
| 7,703,851 B2 * | 4/2010 | Nakaya .................... B60N 2/34 297/344.15 |
| 10,569,670 B2 * | 2/2020 | Mizukoshi ........... B60N 2/1615 |
| 2008/0079300 A1 | 4/2008 | Kojima et al. |

FOREIGN PATENT DOCUMENTS

JP 2008-87554 4/2008

* cited by examiner

*Primary Examiner* — Syed A Islam
(74) *Attorney, Agent, or Firm* — GREENBLUM & BERNSTEIN, P.L.C.

(57) ABSTRACT

Provide is a vehicle seat capable of inhibiting rattling of a seat cushion provided with a lifting device. One embodiment of the present disclosure is a vehicle seat including a lifting device for a seat cushion. The lifting device includes a pinion gear, a sector gear engaged therewith, a link rotating, together with the sector gear, with respect to the cushion frame, and a rubber member attached to the cushion frame. The link is displaced between a first position where a position of the seat cushion is lowest and a second position where the position of the seat cushion is highest. When the link is at the first position, or at the second position, or in a region between the first position and the second position, the rubber member is brought in pressure contact with the sector gear along a direction intersecting a rotational axis of the sector gear.

9 Claims, 4 Drawing Sheets

VEHICLE SEAT

CROSS-REFERENCE TO RELATED APPLICATIONS

This application claims the benefit of Japanese Patent Application No. 2021-153483 filed on Sep. 21, 2021 with the Japan Patent Office, the entire disclosure of which is incorporated herein by reference.

BACKGROUND

The present disclosure relates to a vehicle seat.

A seat mounted on a vehicle, such as an automobile, is provided with, for example, a lifting device such as a lifter device for moving a cushion frame up and down. The lifting device includes a pinion gear rotated by a power source such as an actuator, a sector gear engaged with the pinion gear, and a link rotated together with the sector gear. By rotation of the link, a cushion frame coupled to the link is raised and lowered.

It has been known that such lifting device has a structure of maintaining engagement between the pinion gear and the sector gear against a load from the outside (see Japanese Unexamined Patent Application Publication No. 2008-87554).

SUMMARY

Between the pinion gear and the sector gear, a certain backlash exists. In the above-described lifting device, the engagement between the pinion gear and the sector gear is maintained, but the backlash is not reduced. Accordingly, the backlash between the pinion gear and the sector gear may result in rattling of a seat cushion.

In one aspect of the present disclosure, it is preferable to provide a vehicle seat capable of inhibiting rattling of a seat cushion provided with a lifting device.

One embodiment of the present disclosure is a vehicle seat comprising a seat cushion, a cushion frame supporting the seat cushion, and a lifting device configured to raise and lower at least a portion of the seat cushion.

The lifting device comprises a power source, a pinion gear rotated by the power source, a sector gear engaged with the pinion gear, a link coupled to the cushion frame and rotating, together with the sector gear, with respect to the cushion frame, and a rubber member attached to the cushion frame.

The link is configured to be displaced between a first position where a position of the seat cushion is lowest and a second position where the position of the seat cushion is highest, by rotation of the sector gear. When the link is in at least one of the first position, the second position, or a region between the first position and the second position, the rubber member is brought in pressure contact with the sector gear along a direction intersecting a rotational axis of the sector gear.

This configuration enables the rubber member to be brought in pressure contact with the sector gear, thereby to inhibit displacement along a direction intersecting the rotational axes of the sector gear and the link. As a result, the rattling of seat cushion is inhibited.

In one embodiment of the present disclosure, the rubber member may be brought in pressure contact with the sector gear at least when the link is at the second position. This configuration can reduce displacement of the link at the second position where the link has the largest movement of swinging. As a result, the rattling of the seat cushion can be effectively inhibited.

In one embodiment of the present disclosure, the rubber member may be spaced away from the sector gear when the link is at the first position. This configuration can reduce a rotational resistance of the sector gear at the first position where the link has the smallest movement of swinging. As a result, the seat cushion can smoothly move up. In addition, the rubber member can be assembled without interfering with the sector gear.

In one embodiment of the present disclosure, the sector gear may have an opening, in which the rubber member is arranged. The rubber member may be brought in pressure contact with an inner surface of the opening. This configuration can increase flexibility of placement of the rubber member in the cushion frame.

In one embodiment of the present disclosure, the rubber member may be brought in pressure contact with a region of the inner surface of the opening, the region being located further away from a rotational axis of the sector gear than the rubber member. This configuration enables the rubber member to be brought in pressure contact with a portion of the opening where a large moment is generated. Consequently, a reducing effect of rattling can be improved.

In one embodiment of the present disclosure, the lifting device may further comprise a bracket, the sector gear being arranged between the bracket and the cushion frame, and further comprise a bolt fixing the bracket to the cushion frame. The bolt may be arranged in the opening. The rubber member may be supported by the bolt. This configuration enables the bracket to protect the sector gear. In addition, the bolt supports the rubber member, whereby a space for the lifting device can be saved.

In one embodiment of the present disclosure, the rubber member may have a cylindrical shape, and be configured to rotate by sliding on the sector gear. This configuration enables changes in a location of a contact surface between the rubber member and the sector gear, thus increasing durability of the rubber member.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment

1-1. Configuration

Figure 1:
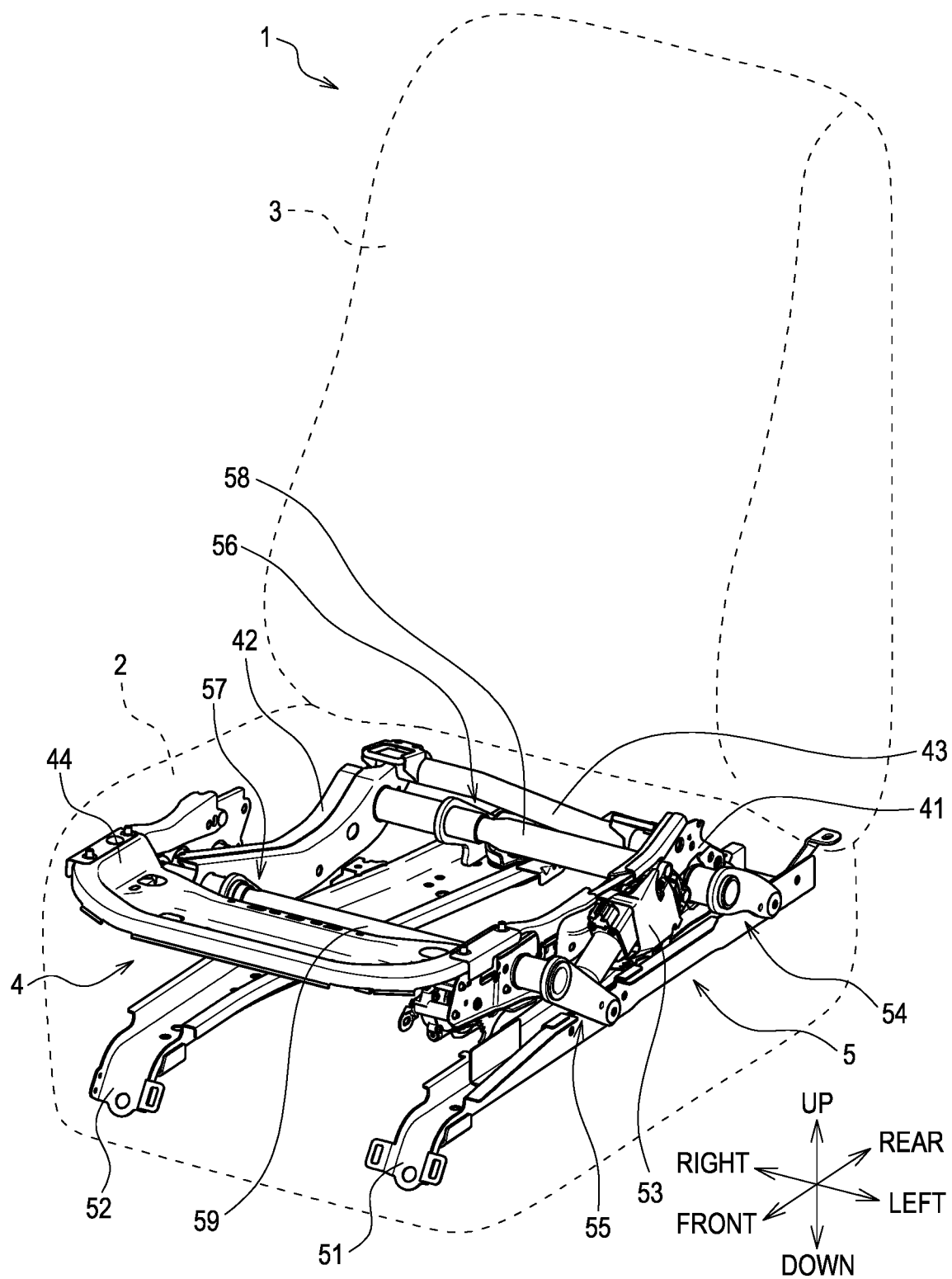
FIG. 1 is a schematic perspective view of a vehicle seat in an embodiment.

A vehicle seat 1 shown in FIG. 1 comprises a seat cushion 2, a seatback 3, a cushion frame 4, and a lifting device 5.

The vehicle seat 1 in the present embodiment is used as a seat of a passenger car. Each direction in the description below and the drawings means a direction in a state where the vehicle seat 1 is assembled to a vehicle (that is, the passenger car). Also, in the present embodiment, a seat-width direction coincides with right-left directions of the vehicle, and a seat front side coincides with a front side of the vehicle.

The seat cushion 2 supports an occupant's buttocks. The seatback 3 supports the occupant's back. The cushion frame 4 supports the seat cushion 2.

[Cushion Frame]

The cushion frame 4 comprises a first side frame 41, a second side frame 42, a frame rod 43, and a front panel 44.

Each of the first side frame 41 and the second side frame 42 is a panel-shaped member extending along seat front-rear directions. The first side frame 41 and the second side frame 42 are spaced away from each other in the seat-width direction. The first side frame 41 is positioned on the left of the second side frame 42.

The frame rod 43 couples a rear end of the first side frame 41 and a rear end of the second side frame 42 in the seat-width direction. The front panel 44 is arranged so as to bridge over a front end of the first side frame 41 and a front end of the second side frame 42.

[Lifting device]

The lifting device 5 comprises a lifter configured to move the cushion frame 4 up and down, to thereby raise and lower the entire seat cushion 2.

Figure 2A:
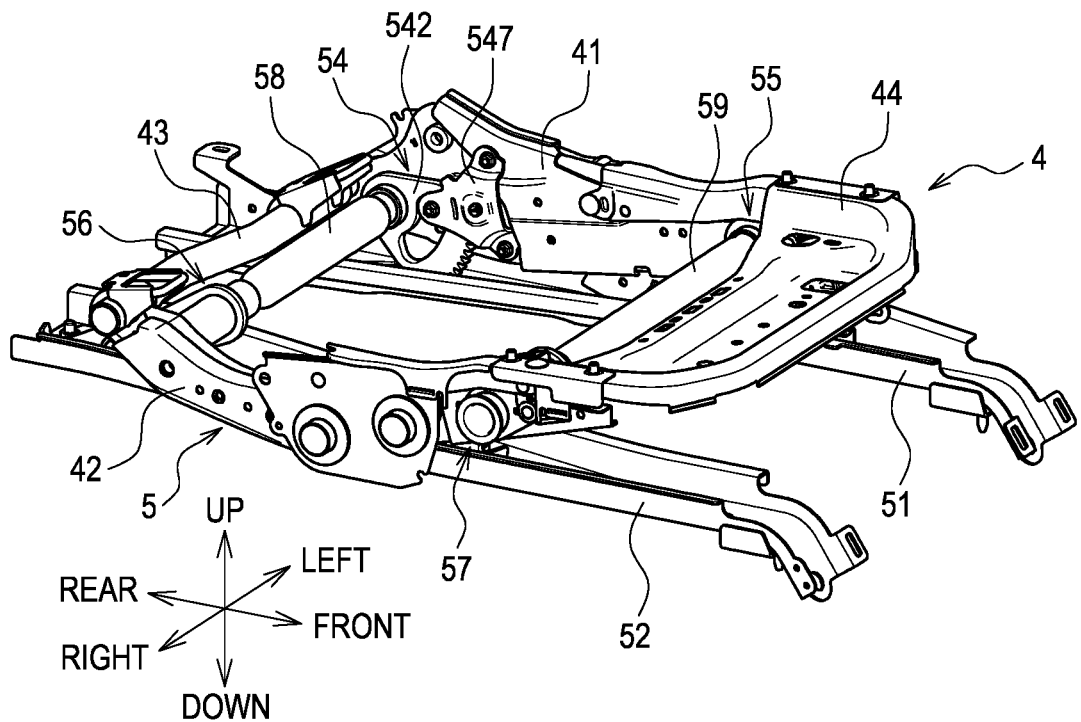
FIG. 2A is a schematic perspective view of a cushion frame and a lifting device of the vehicle seat of FIG. 1.
Figure 2B:
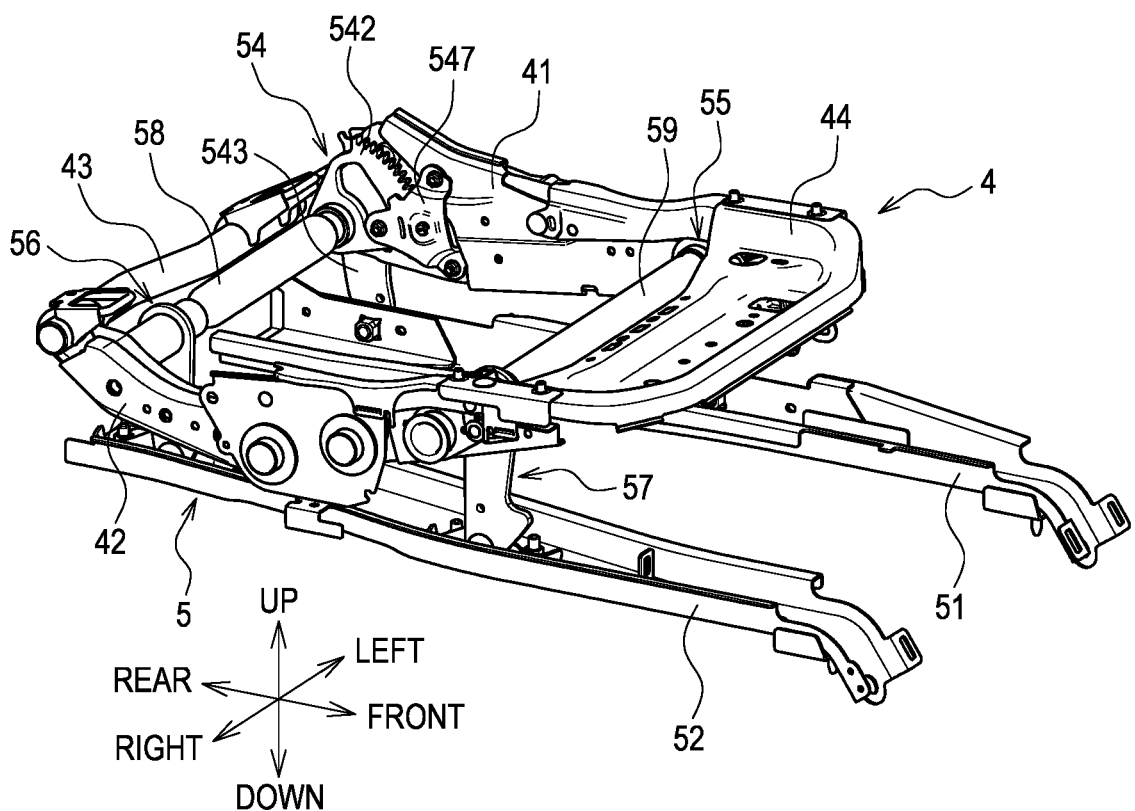
FIG. 2B is a schematic perspective view of the cushion frame and the lifting device of the vehicle seat of FIG. 1.

The lifting device 5 displaces the seat cushion 2 and the cushion frame 4 between a lowermost position shown in FIG. 2A and an uppermost position shown in FIG. 2B. The lifting device 5 comprises a first leg 51, a second leg 52, a power source 53 (see FIG. 1), a first link mechanism 54, a second link mechanism 55, a third link mechanism 56, a fourth link mechanism 57, a first coupling rod 58, and a second coupling rod 59.

<Leg>

The first leg 51 and the second leg 52 are arranged below the cushion frame 4, and each fixed to an automobile. The first leg 51 and the second leg 52 are spaced away from each other in the seat-width direction. The first leg 51 is arranged on the left of the second leg 52.

<Power Source>

The power source 53 shown in FIG. 1 is a device that generates a drive force for driving the first link mechanism 54. The power source 53 is mounted on the first side frame 41, and moves up and down together with the first side frame 41. As the power source 53, an electric actuator, a hydraulic actuator, or a pneumatic actuator can be used.

<First Link Mechanism>

Figure 3:
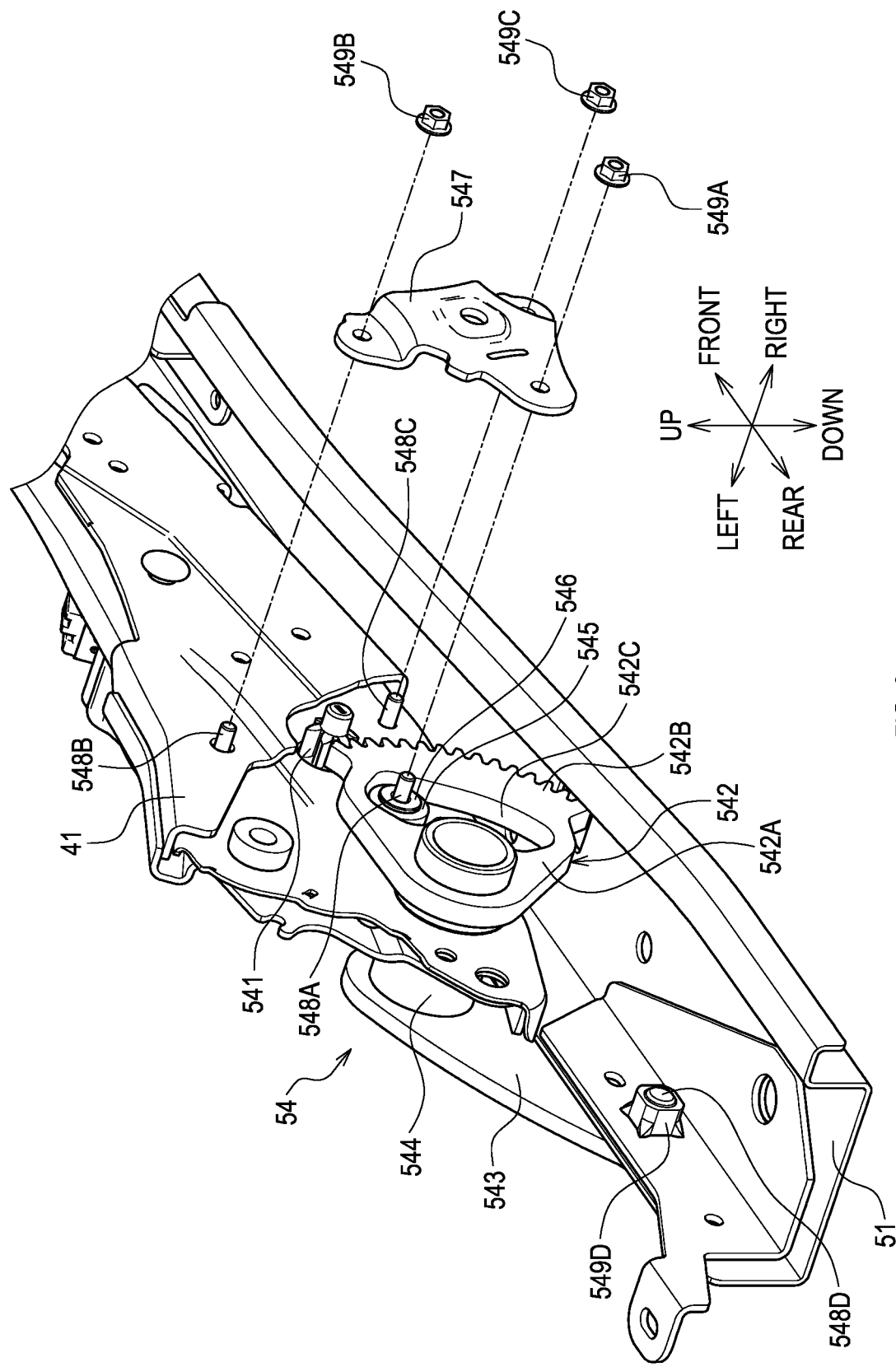
FIG. 3 is a schematic perspective and exploded view of a first link mechanism of the lifting device of FIG. 2A.

The first link mechanism 54 couples the first side frame 41 and the first leg 51. As shown in FIG. 3, the first link mechanism 54 comprises a pinion gear 541, a sector gear 542, a link 543, a coupling portion 544, a rubber member 545, a spoiler 546, a bracket 547, a first bolt 548A, a second bolt 548B, a third bolt 548C, a fourth bolt 548D, a first nut 549A, a second nut 549B, a third nut 549C, and a fourth nut 549D.

<Pinion Gear>

The pinion gear 541 is drive-coupled to the power source 53 for rotation by the power source 53. A rotational axis of the pinion gear 541 is parallel to the seat-width direction.

The pinion gear 541 is rotatably mounted on the first side frame 41.

Specifically, the pinion gear 541 is positioned on the seat-width direction inner side (that is, on the right) relative to the first side frame 41. The pinion gear 541 is immovable relative to the first side frame 41.

<Sector Gear>

The sector gear 542 is engaged with the pinion gear 541. The sector gear 542 is rotated (that is, swung) in up-down directions by rotation of the pinion gear 541 (that is, by a power transmitted from the pinion gear 541). Between the pinion gear 541 and the sector gear 542, a constant backlash is provided.

The sector gear 542 comprises a main body 542A, gear teeth 542B, and an opening 542C. The coupling portion 544 is inserted and fixed to the main body 542A. The gear teeth 542B are provided on an outer circumferential surface of the main body 542A, and engaged with teeth of the pinion gear 541 from a seat rear side. The opening 542C is formed between the gear teeth 542B and a portion of the main body 542A that is fixed to the coupling portion 544.

The sector gear 542 is rotatably mounted on the first side frame 41 through the coupling portion 544. The sector gear 542 is positioned on the seat-width direction inner side (that is, on the right) relative to the first side frame 41. A rotational axis of the sector gear 542 is parallel to the rotational axis of the pinion gear 541.

<Link>

The link 543 is a strip-shaped member rotatable together with the sector gear 542 with respect to the cushion frame 4 (that is, the first side frame 41).

One end portion of the link 543 is fixed to the coupling portion 544. The link 543 is coupled to the first side frame 41 through the coupling portion 544, and integrated with the sector gear 542 by the coupling portion 544. The link 543 is positioned on a seat-width direction outer side relative to the first side frame 41.

The other end portion of the link 543 is rotatably mounted on the first leg 51 by the fourth bolt 548D and the fourth nut 549D. The link 543 rotates around the fourth bolt 548D in accordance with rotation of the sector gear 542. A rotational axis of the link 543 is parallel to the seat-width direction.

Specifically, when the sector gear 542 is rotated upward, the link 543 rotates so as to stand up while moving coupling portion 544 upward. Accordingly, the cushion frame 4 moves up. In contrast, when the sector gear 542 is rotated downward, the link 543 rotates so as to recline (tilt or collapse) while moving the coupling portion 544 downward. Accordingly, the cushion frame 4 moves down.

By rotation of the sector gear 542, the link 543 is displaced between a first position (see FIG. 1) in which the seat cushion 2 is in the lowermost position and a second position (see FIG. 2B) in which the seat cushion 2 is in the uppermost position. When the link 543 is at the second position, an angle between the central axis of the link 543 and a horizontal plane is greater than that when at the first position.

<Coupling Portion>

The coupling portion 544 is a pipe-like member coupling the sector gear 542 and the link 543 in the seat-width direction. The coupling portion 544 passes through the first side frame 41 in the seat-width direction. An inner end of the coupling portion 544 in the seat-width direction is fixed to the first coupling rod 58 (see FIG. 2A).

<Rubber member and Spoiler>

The rubber member 545 is a member for providing a rotational resistance to the sector gear 542. The rubber member 545 is attached to the first side frame 41, and arranged within the opening 542C of the sector gear 542. The rubber member 545 is immobile with respect to the first side frame 41.

The rubber member 545 is a roller having a cylindrical shape. The rubber member 545 is elastically deformable at least in a radial direction. The rubber member 545 is brought in pressure contact with an inner surface of the opening 542C, in accordance with the position of the sector gear 542.

The spoiler 546 is a bearing inserted into the rubber member 545. The first bolt 548A is inserted into a central part of the spoiler 546. The spoiler 546 is rotatable with respect to the first bolt 548A. In other words, the rubber member 545 is supported by the first bolt 548A through the spoiler 546, and is rotatable around the first bolt 548A.

Figure 4:
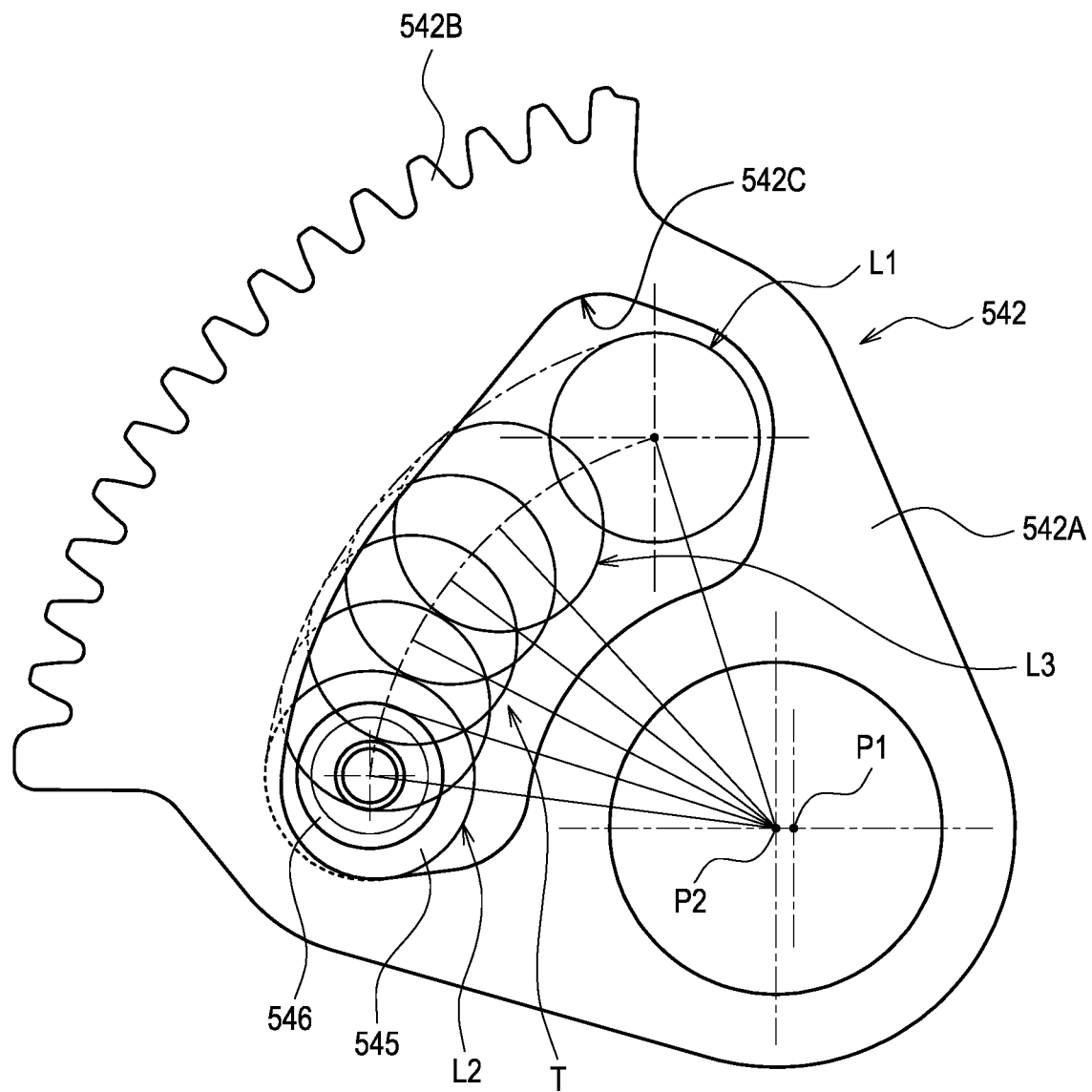
FIG. 4 is a schematic diagram of a relative locus of a rubber member with respect to the sector gear of the first link mechanism of FIG. 3.

FIG. 4 shows changes in a relative position of the rubber member 545 relative to the sector gear 542 during rotation of the sector gear 542. FIG. 4 illustrates a locus T of the rubber member 545 relative to the sector gear 542 during rotation of the sector gear 542.

When the cushion frame 4 is at the lowermost position (that is, when the link 543 is at the first position), the rubber member 545 is at a first position L1 in the locus T. In the locus T, the first position L1 is a topmost position in the opening 542C.

When the rubber member 545 rotates from the first position L1 in a direction that causes the sector gear 542 to raise the cushion frame 4, the rubber member 545 relatively moves toward the second position L2 in the locus T. The second position L2 is a bottommost position in the locus T in the opening 542C.

In contrast, when the rubber member 545 rotates from the second position L2 in a direction that causes the sector gear 542 to lower the cushion frame 4, the rubber member 545 relatively moves toward the first position L1 in the locus T.

The rubber member 545 is brought in pressure contact with the sector gear 542 in directions (that is, the seat front-rear directions and the up-down directions) perpendicular to the rotational axis of the sector gear 542, in an area from the third position L3 away from the first position L1, through the second position L2.

In other words, when the link 543 is at the second position, or in a region between the first position and the second position, the rubber member 545 is brought in pressure contact with the sector gear 542. Further, when the link 543 is at the first position, the rubber member 545 is spaced away from the sector gear 542.

Specifically, the rubber member 545 is brought in pressure contact with a region, of the inner surface of the opening 542C of the sector gear 542, further away from the rotational axis P1 of the sector gear 542 than the rubber member 545 (in other words, a portion, of the inner surface of the opening 542C, located radially outward of the sector gear 542).

Of the rubber member 545, a portion in pressure contact with the inner surface of the opening 542C is compressed in a radial direction of the rubber member 545. Thus, an outer profile of the rubber member 545 is shaped in a perfect circular, but is partly recessed due to the pressure contact, thereby resulting in an asymmetrical shape.

The rubber member 545 is configured to rotate by sliding on the inner surface of the opening 542C of the sector gear 542 (that is, by a friction force). In other words, the rubber member 545 rotates about its own axis in an area from the third position L3 through the second position L2 in accordance with rotation of the sector gear 542. Accordingly, of the rubber member 545, a position of the portion to bring in pressure contact with the inner surface of the opening 542C is changed in accordance with rotation of the sector gear 542.

Further, the rubber member 545 relatively moves along an arc whose center is a pivot axis P2, relative to the sector gear 542. The pivot axis P2 of the rubber member 545 does not coincide with the rotational axis P1 of the sector gear 542, and is on a radially outer side (in particular, on the seat front side) relative to the rotational axis P1 of the sector gear 542.

Accordingly, as the rubber member 545 moves closer to the second position L2 from the third position L3, a pressure (in other words, a pressing force of the rubber member 545 against the inner surface of the opening 542C) to be applied to the sector gear 542 from the rubber member 545 is greater.

In other words, along with movements such that the link 543 stands up from the first position toward the second position, the friction force that the rubber member 545 provides to the sector gear 542 becomes greater. This configuration can increase a rotational resistance of the sector gear 542, following the magnitude of rattling.

<Bracket>

The bracket 547 shown in FIG. 3 is a planar member. The sector gear 542 is arranged between the bracket 547 and the first side frame 41 in the seat-width direction.

The bracket 547 covers, from the seat-width direction inner side, the entire pinion gear 541 and an engagement portion of the sector gear 542 engaged with the pinion gear 541. The bracket 547 is fastened to the first side frame 41 by the first bolt 548A, the second bolt 548B, the third bolt 548C, the first nut 549A, the second nut 549B, and the third nut 549C, The first bolt 548A is arranged within the opening 542C of the sector gear 542. As described above, the first bolt 548A serves as a shaft portion of the rubber member 545. The first nut 549A is screwed on the first bolt 548A from the seat-width direction inner side.

The second bolt 548B is arranged above the first bolt 548A. The second nut 549B is screwed on the second bolt 548B from the seat-width direction inner side. The third bolt 548C is arranged below the first bolt 548A. The third nut 549C is screwed on the third bolt 548C from the seat-width direction inner side.

<Second Link Mechanism>

The second link mechanism 55 shown in FIG. 1 couples the first side frame 41 and the first leg 51 on the seat front side with respect to the first link mechanism 54.

The second link mechanism 55 rotates a link by a power source (not shown), similar to the first link mechanism 54. The second link mechanism 55 works together with the first link mechanism 54 to move the first side frame 41 up and down.

<Third Link Mechanism and Fourth Link Mechanism>

The third link mechanism 56 and the fourth link mechanism 57 are respectively coupled to the second side frame 42 and the second leg 52.

The third link mechanism 56 is coupled to the first link mechanism 54 by the first coupling rod 58. The third link mechanism 56 is synchronized with the first link mechanism 54 to operate. The fourth link mechanism 57 is coupled to the second link mechanism 55 by the second coupling rod 59. The fourth link mechanism 57 is synchronized with the second link mechanism 55 to operate.

The first link mechanism 54, the second link mechanism 55, the third link mechanism 56, and the fourth link mechanism 57 concurrently operate, thereby to raise and lower the seat cushion 2 and the cushion frame 4.

1-2. Effects

According to the embodiment detailed as above, the following effects can be obtained.

(1a) The rubber member 545 is brought in pressure contact with the sector gear 542, thereby to inhibit displacement along a direction intersecting the rotational axes of the sector gear 542 and the link 543 (that is, in the seat front-rear direction). As a result, the rattling of the seat cushion 2 is inhibited.

(1b) When the link 543 is located at the second position, the rubber member 545 is brought in pressure contact with the sector gear 542, thereby to enable reduction in displacement of the link 543 at the second position where the link 543 has the largest movement of swinging. As a result, rattling of the seat cushion 2 can be effectively inhibited.

(1c) When the link 543 is at the first position, the rubber member 545 is spaced away from the sector gear 542, thereby to enable reduction in the rotational resistance of the sector gear 542 at the first position where the link 543 has the smallest movement of swinging. As a result, the seat cushion 2 can be smoothly moved up. In addition, the rubber member 545 can be assembled without interfering with the sector gear 542.

(1d) The rubber member 545 is brought in pressure contact in the region, of the inner surface of the opening 542C, further away from the rotational axis of the sector gear 542 than the rubber member 545. This configuration can increase flexibility of placement of the rubber member 545 in the cushion frame 4. In addition, the rubber member 545 is brought in pressure contact with a portion of the opening 542C where a large moment is generated. Consequently, a reducing effect of rattling can be improved.

(1e) With the bracket 547, the sector gear 542 can be protected. In addition, the first bolt 548A supports the rubber member 545, whereby a space for the lifting device 5 can be saved.

(1f) The rubber member 545 rotates by sliding on the sector gear 542, thereby to change a location of a contact surface between the rubber member 545 and the sector gear 542. This configuration enables an increase in durability of the rubber member 545.

2. Other Embodiments

Although one embodiment of the present disclosure has been described above, it is to be understood that the present disclosure is not limited to the embodiment above, but may be implemented in various forms.

(2a) In the vehicle seat of the aforementioned embodiment, the rubber member may be always in pressure contact with the sector gear during displacement of the link from the first position to the second position. Also, the rubber member may be spaced away from the sector gear when the link is at a position other than the first position.

(2b) In the vehicle seat of the aforementioned embodiment, the rubber member may be brought in pressure contact with a region other than the region, of the inner surface of the opening of the sector gear, further away from the rotational axis of the sector gear than the rubber member (for example, a region located radially inward of the sector gear).

(2c) In the vehicle seat of the aforementioned embodiment, the rubber member does not necessarily have to be arranged in the opening of the sector gear. For example, the rubber member may be arranged outside the sector gear, and may be brought in pressure contact with the outer circumferential surface of the sector gear, (2d) In the vehicle seat of the aforementioned embodiment, the rubber member does not necessarily have to rotate by sliding together with the sector gear. In addition, the rubber member does not necessarily have to have a cylindrical shape.

(2e) In the vehicle seat of the aforementioned embodiment, the configuration of the first link mechanism may be applied to a tilting device which swings a portion (for example, a front end) of the seat cushion in the up-down directions. In other words, the present disclosure may be also applied to a vehicle seat comprising a tilting device, (2f) The vehicle seat of the aforementioned embodiment may also be applied to a seat for use in automobiles other than passenger cars, or in any vehicles other than automobiles, such as railway vehicles, ships and boats, and aircrafts.

(2g) It may be possible to divide a function performed by one element in the aforementioned embodiments to a plurality of elements, or to integrate functions of a plurality of elements into one element. Also, the configurations in the aforementioned embodiments may be partly omitted. Further, at least a portion of a configuration in the aforementioned embodiments may be added to, or may be replaced with another configuration of the aforementioned embodiments. Any form that falls within the scope of the technical ideas defined by the language of the appended claims may be an embodiment of the present disclosure.

What is claimed is:

1. A vehicle seat, comprising:
    a seat cushion;
    a cushion frame supporting the seat cushion; and
    a lifting device configured to raise and lower at least a portion of the seat cushion,
    wherein the lifting device comprises:
        a power source;
        a pinion gear rotated by the power source;
        a sector gear engaged with the pinion gear;
        a link coupled to the cushion frame, and rotating, together with the sector gear, with respect to the cushion frame; and
        a rubber member attached to the cushion frame,
    wherein the link is configured to be displaced between a first position where a position of the seat cushion is lowest and a second position where the position of the seat cushion is highest, by rotation of the sector gear, and
    wherein, in a state that the link is in at least one of the first position, the second position, or a region between the first position and the second position, the rubber member is brought in pressure contact with the sector gear along a direction intersecting a rotational axis of the sector gear and moves along an arc relative to the sector gear, the arc having a center that is a pivot axis of the rubber member, wherein the pivot axis is offset from the rotational axis of the sector gear.

2. The vehicle seat according to claim 1,
    wherein the rubber member is brought in pressure contact with the sector gear at least in a state that the link is at the second position.

3. The vehicle seat according to claim 1,
    wherein the rubber member is spaced away from the sector gear in a state that the link is at the first position.

4. The vehicle seat according to claim 1,
wherein the sector gear has an opening, in which the rubber member is arranged, and wherein the rubber member is brought in pressure contact with an inner surface of the opening.

5. The vehicle seat according to claim 4,
wherein the rubber member is brought in pressure contact with a region of the inner surface of the opening, the region being located further away from the rotational axis of the sector gear than the rubber member.

6. The vehicle seat according to claim 4,
wherein the lifting device further comprises:
a bracket, the sector gear being arranged between the bracket and the cushion frame; and
a bolt fixing the bracket to the cushion frame,
  wherein the bolt is arranged in the opening, and
  wherein the rubber member is supported by the bolt.

7. The vehicle seat according to claim 1,
wherein the rubber member has a cylindrical shape, and is configured to rotate by sliding on the sector gear.

8. The vehicle seat according to claim 3,
wherein the lifting device further comprises a support member that supports the rubber member, the rubber member being attached to the cushion frame by the support member.

9. The vehicle seat according to claim 1,
wherein the rubber member is configured such that, as the link moves closer to the second position, a pressure to be applied to the sector gear from the rubber member is greater.

* * * * *